United States Patent [19]

Mellor et al.

[11] Patent Number: 5,170,378
[45] Date of Patent: Dec. 8, 1992

[54] HYDRAULIC IMPEDANCE TEST METHOD

[75] Inventors: David W. Mellor, Camberley; John W. A. Millar, Twickenham, both of England

[73] Assignee: The British Petroleum Company p.l.c., London, England

[21] Appl. No.: 864,143

[22] Filed: Apr. 6, 1992

Related U.S. Application Data

[63] Continuation of Ser. No. 742,512, Aug. 5, 1991, abandoned, which is a continuation of Ser. No. 502,387, Mar. 30, 1990, abandoned.

[30] Foreign Application Priority Data

Apr. 4, 1989 [GB] United Kingdom ............... 8907525

[51] Int. Cl.$^5$ .............................................. G01V 1/40
[52] U.S. Cl. ...................................... 367/86; 367/35; 181/105; 73/151
[58] Field of Search .............. 367/35, 30; 181/105, 181/106; 73/151, 152; 364/422

[56] References Cited

U.S. PATENT DOCUMENTS

| | | | |
|---|---|---|---|
| 2,281,751 | 5/1942 | Cloud | 181/106 |
| 4,432,078 | 2/1984 | Silverman | 367/37 |
| 4,671,379 | 6/1987 | Kennedy et al. | 181/106 |
| 4,783,769 | 11/1988 | Holzhausen | 367/35 |
| 4,802,144 | 1/1989 | Holzhausen et al. | 367/35 |
| 4,858,130 | 8/1989 | Widrow | 73/151 |
| 4,869,338 | 9/1989 | Wiggins et al. | 181/106 |
| 4,907,204 | 3/1990 | Medlin | 367/35 |

OTHER PUBLICATIONS

Anderson et al., "A Study of Induced Fracturing Using an Instrumental Approach", SPE of AIME, Oct. 2-5, 1986.

Berest, P., "Vibratory Phenomena in Oil Drill Holes Application to the Calculation of the Volume of Underground Cavities", Revue Francais de Geotechnique, 1985, No. 32.

*Primary Examiner*—Ian J. Lobo
*Attorney, Agent, or Firm*—David J. Untener; Larry W. Evans

[57] ABSTRACT

A method for determining the height and length of a fracture (3) in a borehole (1) involves generating pressure waves in the fluid in the wellbore using a valve (4) and measuring the response at the well-head by means of a transducer (5). A theoretical model of the wellbore-fracture system is generated and compared with the measured response to determine the height and length of the fracture.

6 Claims, 9 Drawing Sheets

HYDRAULIC IMPEDANCE TEST METHOD

This is a continuation of co-pending application Ser. No. 07/742,512 filed on Aug. 5, 1991, now abandoned, which is a continuation of co-pending application Ser. No. 07/502,387 filed on Mar. 30, 1990, now abandoned.

This invention relates to a method for determining the extent of fracturing in a mineral formation such as a petroleum reservoir by measuring hydraulic impedance.

A petroleum reservoir is formed by a suitably shaped porous stratum of rock sealed with an impervious rock. The nature of the reservoir rock is extremely important as the oil is present in the small spaces or pores which separate the individual rock grains.

Crude oil is generally found in a reservoir in association with water, which is often saline, and gas. Dependent upon the characteristics of the crude, the temperature and the pressure, the gas may exist in solution in the oil or as a separate phase in the form of a gas cap. The oil and gas occupy the upper part of the reservoir and below there may be a considerable volume of water, known as the aquifer, which extends throughout the lower levels of the rock.

For oil to move through the pores of the reservoir rock and into a well, the pressure under which the oil exists in the reservoir must be greater than the pressure at the well.

The water contained in the aquifer is under pressure and is one source of drive. The dissolved gas is associated with the oil is another and so is the free gas in the gas cap when this is present.

A time will come in the life of an oilfield when the natural pressure of the reservoir declines to such an extent that it is no longer sufficient to force the oil out of the pores of the rock into the well. This stage is often reached before the greater part of the oil is recovered from the reservoir.

Formerly it was the practice to rely on natural drive for as long as possible, only resorting to artificial production methods when the natural pressure dropped too low to sustain a reasonable flow.

However, it has now been established that the eventual recovery of oil from a reservoir can be much greater if the pressure is not allowed to drop significantly in the early stages of production. Similarly, by utilising artificial means of maintaining pressure early in the life of a reservoir, production offtake rates may often be adjusted to economic advantage.

Thus in order to maintain pressure, or to accelerate the natural drive, or to initiate a drive where none occurs naturally, it is frequently necessary to employ the technique known as secondary recovery. The simplest method of forcing the oil out of the reservoir rock is by direct displacement with another fluid. When water is used, the secondary recovery process is called water flooding. The water is injected under considerable pressure.

The formation may contain natural fractures and further fracturing may be induced by the action of water injection, depending on the susceptibility of the formation to fracture.

In order to optimise the effect of water flooding, it is clearly desirable to know the extent of fracturing (existing and potential) in the formation to enable the probable direction of flow of the injected water to be predicted.

Anderson and Stahl, Society of Petroleum Engineers (SPE) Paper No 1537 (1966) noted that if the fluid column in a well bore was made to oscillate, the presence of fracturing in the formation caused an increase in the period of oscillation of the fluid column.

U.S. Pat. No. 4,802,144 describes a method which by inducing oscillations in a fluid in a well bore and by measuring the resulting pressure oscillations the theoretical shape of the fracture can be calculated. By comparing the measured pressure oscillations with the theoretically calculated oscillations an estimate of the shape of the fracture can be obtained.

This technique has been called Hydraulic Impedance Testing (HIT).

However the length of the fracture is not determined directly but from calculations based on assumptions regarding the shape of the fracture.

We have now found that during hydraulic impedance testing some of the pulse energy resulting from the induced oscillations is partitioned into the fracture, travels to the fracture tip and is reflected back into the well bore as an echo. The time delay between the primary reflection at the fracture mouth and the echo from the fracture tip gives a direct measure of the fracture length.

Thus according to the present invention there is provided a method for determining the height and length of a fracture in a formation in contact with a borehole comprising the steps of (a) generating a hydraulic pressure transient in the fluid in the borehole, said pressure transient propagating to the bottom of the wellbore-fracture system and to the tip of the fracture, (b) obtaining an indication of the resultant reflections of said pressure transient from both the mouth and the tip of the fracture, (c) generating a theoretical model of the wellbore-fracture system, and (d) adjusting the parameters of height and length of the fracture in said model to obtain a match with said indication to determine the height and length of the fracture.

The pressure transient may be produced by rapidly opening and closing a valve e.g. a ball valve on the injection well head to initiate a water hammer type of shock wave.

Other means of introducing pressure transients may be suitable for example a pressure oscillator or a mechanical shutter.

The pressure transient propagates down through the fluid in the wellbore, inside the tubulars if present, and is reflected at the bottom of the wellbore e.g. at the shoe which seals the wellbore base.

The response of the well bore to the pressure transients may be measured by means of a transducer positioned at the well head, in contact with the fluid in the wellbore. The response may be observed as a plot of pressure fluctuation against time and will be referred to as a HIT trace.

The completed water-injector is then perforated and the water pressure raised sufficiently to cause either deliberate or inadvertent hydraulic fracturing of the formation. HIT performed on a fractured injector shows reflections of the pressure transient from the mouth of the fracture due to the acoustic impedance mismatch between the wellbore and fracture. The open fracture often represents a much lower acoustic impedance than the shoe, and consequently the HIT trace envelope changes markedly once fracturing has taken place. As the fracture opens its acoustic impedance drops towards that of the wellbore and the attenuation of the HIT trace envelope increases. Once the impedance of the fracture has fallen to less than that of the wellbore the acoustic reflection from the fracture mouth undergoes a change of phase.

The acoustic impedance of the wellbore is determined by the fluid properties of the fluid in it, together with the dimensions of the wellbore and in the context of the present invention is equivalent to the hydraulic impedance. For example making a number of assumptions, such as Poiseille (or laminar) flow down the wellbore a simple mathematical model gives the impedance of the wellbore $Z_w$ of radius r to be $$Z_w = \frac{a}{\pi r^2 g}$$

where a is the sonic velocity in the fluid and g the acceleration due to gravity.

Similarly by treating the fracture as two elliptical half-wings in the plane of the wellbore with half-height $h_f$ and half length $l_f$, the half height is given by $$h_f^2 = \frac{\sqrt{3}\,\mu_s \alpha_s}{\sqrt{(8\rho P_e)}\,g(1-\nu)Z_f}$$

where
- $\mu_s$ is the shear modulus of the rock formation,
- $\alpha_s$ is the fracture shape factor,
- $\nu$ Poisson's ratio for the formation,
- $\rho$ the fluid density
- $P_e$ the excess pressure of the fluid in the fracture over that in the formatin, and
- $Z_f$ is the fracture acoustic impedance.

The fracture shape factor is based on the estimated height and length of the fracture.

This equation assumes that the fluid storage in the fracture is uniformly distributed along the fracture wings, and that the pressure waves in the fluid do not couple to elastic waves in the fracture walls.

Therefore it can be seen that as the half-height $h_f$ of the fracture increases the acoustic impedance of the fracture $Z_f$ drops.

The expression for the half length of the fracture can similarly be deduced as $$l_f = \sqrt{\frac{(3 P_e)}{(2\rho)}}\,\tau$$

where $\tau$ = time taken for the pulse to propagate down the fracture.

The acoustic impedance of the fracture dimensions can thus be measured from the attenuation of the HIT trace.

Any loss of impedance due to the shoe can be estimated.

Optionally the loss can be measured by pre-fracturing measurements. In this way HIT traces are recorded using the wellhead transducer before perforation of the wellbore, and the trace decay envelope is a measure of how attenuated the pressure transient is by reflection at the bottom of the wellbore e.g. the shoe and subsequently at the wellhead. Such optional HIT traces provide baseline calibration data for the well completion which is useful but not essential. The pressure pulse is reflected in-phase by the bottom of the wellbore and the HIT trace records a decaying set of in-phase reflections.

Thus the method of the present invention may further comprise the preliminary step prior to fracturing of generating a hydraulic pressure transient in the fluid in the borehole, said pressure transient propagating to the bottom of the wellbore, and obtaining an indication of the resultant reflection of said pressure transient from the bottom of the well bore.

Whilst the pressure transient during a HIT test is reflected from the fracture mouth due to the acoustic impedance mismatch, a small proportion of the signal is transmitted down the fracture to be reflected at the fracture tip. Once the fracture has opened the main return from the mouth is in antiphase to the original pressure pulse, and this is followed by an 'echo' signal that has travelled down the fracture and been reflected back from the fracture tip. This echo is in phase with the original signal. The length of the fracture determines the delay time between reflection and echo, and hence the detailed shape of the HIT trace.

This ability to determine fracture length by location of the echoes from the fracture tip makes this version of the HIT method of significant value.

The reflections from both the fracture mouth and fracture tip may thus be analysed to allow the fracture dimensions at the base of the wellbore to be determined.

The acoustics of the completion and the fracture system can be accurately simulated by using an electrical analogue system. The wall completion and fracture are represented in the analogue sytem by sections of electrical transmission lines with different electrical impedances linked together, with high resistances representing terminations of a wellbore or fracture where a zero fluid-flow condition will hold.

SECT (Simulation of Electrical Circuit Transients) is a computer software package derived from a computer modelling package called SPICE (Simulation Package with Integrated Circuit Emphasis) available from the University of California at Berkeley. By inputting the parameters obtained from the field data SECT is able to calculate the transient response of a number of linked electrical transmission lines and by analogy to produce the expected HIT trace for a specified fracture size.

The parameters required to characterise the well bore in the electrical analogue are determined from the completion diagram for the well bore. The completion diagram is a representation of the dimensions and sections present in the wellbore and is a term which will be understood by persons skilled in the art. The dimensions of the well bore and the fluid properties determine its characteristic impedance and also the pulse delay time. Similarly, the characteristic impedance of the fracture and the time taken for the pulse to propagate down it are obtained from physical properties of the rock formation and initial estimates of fracture dimensions.

Hence the sonic velocity in the fluid, shear modulus of the rock formation, Poisson's ratio for the formation and the excess pressure are all determined from field data e.g. acoustic logging.

The fluid density is a property of the fracturing fluid e.g. brine.

The fracture shape factor is based on both the estimated height and length of the fracture.

Since voltage is analogous to fluid pressure and current to fluid flow the electrical analogue to the generation of the pressure pulse during HIT is a current source which drives a current through a resistance at the terminals representing the well head. SECT can apply this input current pulse to the appropriate circuit and calculate the transient response of voltage (pressure) at the well head thus predicting the HIT trace expected for a given fracture height and length.

The voltage-time trace generated can be compared directly to the actual HIT trace. First of all the fracture height is adjusted until the trace envelopes match, and then the fracture length is adjusted until the positions of subsidiary peaks due to echoes are in the correct position.

Thus SECT has been employed to find what fracture dimensions will give a HIT trace with the same degree of envelope attenuation as was observed from the field recorded pressure time trace.

As the fracture grows larger the fracture impedance drops to the point which it equals that of the wellbore. There is then no reflection at the fracture mouth and the HIT trace is completely attenuated. With further increase in fracture size the impedance drop at the fracture mouth leads to phase reversal of the returns from the fracture mouth. The signal then fills a growing envelope as the impedance mismatch between wellbore and fracture becomes progressively larger. SECT can be used to determine the fracture height corresponding to the observed HIT trace.

The full SECT simulations are formed by summing the repeated reflections from the fracture mouth and tip.

The fracture height and length are hence obtained virtually independently as the SECT trace is matched to the HIT trace obtained by field measurements.

The invention is illustrated with reference firstly to FIG. 1 of the accompanying drawings which is a schematic diagram of a perforated well undergoing HIT.

Figure 1:
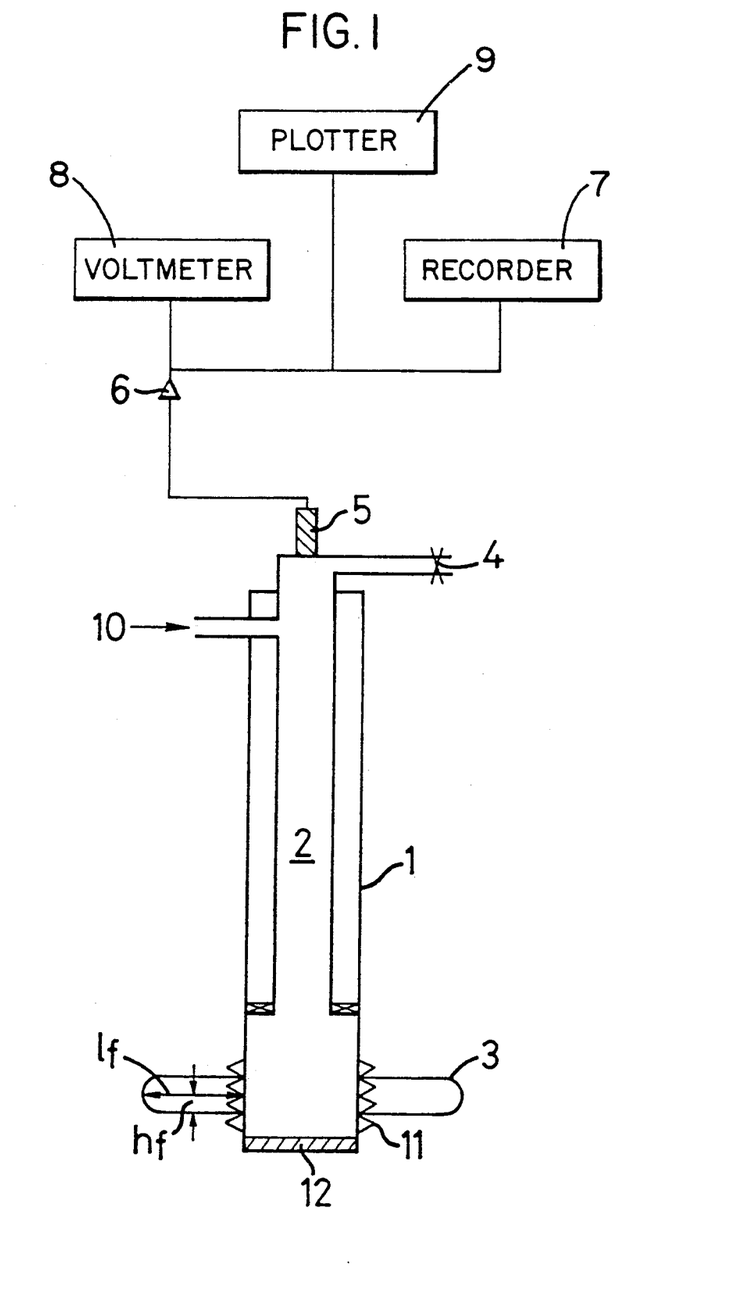
FIG.1 is a schematic diagram of a perforated well undergoing HIT.
Figure 2:
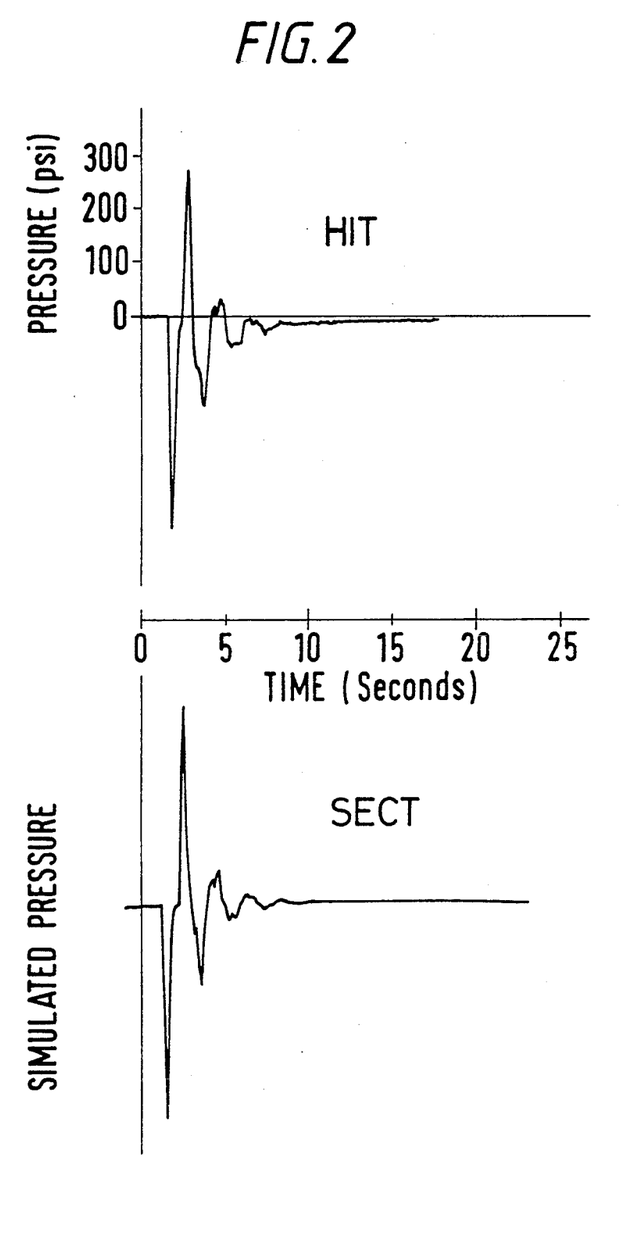
FIGS. 2-8 show the comparison between the HIT traces obtained and the SECT simulation for the fracture described in Example 1.

With reference to FIG. 1 a wellbore 1 containing a perforation region 11 is filled with a water injection tube 2. The wellbore is fractured near the shoe 12 in the region of perforation with the fracture 3 having a half-length $l_f$ and a half-height $h_f$. The water is pressurised by means of a pump 10 and a pressure transient induced by opening and closing a ball valve 4. The pressure is measured by means of a Western Sensors WS 2005 transducer 5. After amplification by an amplifier 6 the signal is recorded on an EDR 8000 digital cassette recorder 7 and displayed on a digital voltmeter 8 and a plotter 9.

The invention is further illustrated with reference to the following Examples and FIGS. 2-9 which show the comparison between HIT and SECT traces obtained by the method of the present invention.

Example 1

This Example was performed on the Chauvin Field in Canada at a well cased to a depth of approximately 1500 meters with continuous 17.78 cm tubing. At this depth the surrounding formation comprised Sparky III sand. The pressure is the well bore was regulated by means of a standard pump truck by controlling the injection of the fracturing fluid. The injection rate data was obtained from a BJ Titan in-line turbine flow meter. The well head pressure was measured using a Western Sensors Ltd transducer type WS 2005 at a frequency of 256 Hz. The output from the transducer was amplified, the data stored on an EDR8000 digital cassette recorded and displayed by means of a standard digital voltmeter and plotter.

Water as fracturing fluid was injected into the well bore stepwise at an increasing rate until fracturing was induced.

Transient conditions were initiated in the well bore fluid by rapidly opening and closing a ball valve situated on the injection well head. The pressure transients reflected from both the mouth and tip of the fractures were measured using the well head transducer which was in direct contact with the fluid column. Transients were studied in the well bore both as the pressure was increased (fracture extension) and as the pressure was reduced (fracture closure). In this way HIT traces of pressure fluctuations against time were recorded for comparison with the simulated SECT traces for the Chauvin formation.

The computer simulation code SECT was then used to interpret the field data obtained from the completion diagram for the well. By adjusting the parameters of fracture length and height SECT traces were obtained which most closely matched the HIT traces obtained from the pressure readings taken at the well head.

FIGS. 2-8 show the comparison between the HIT traces obtained and the SECT simulations for the fracture as it opens and recloses. The values for height and length used to obtain the SECT simulations are given in the accompanying table.

From the table it can be seen that the fracture is initially extending into the surrounding formation. In this region of the Chauvin Field the maximum permeable formation thickness of the Sparky III sand was estimated to be 3.2 meters. The dimensions corresponding to FIG. 4 indicate that the fracture had extended beyond this point before reducing again in height as the fracture continues to extend.

Figure 7:
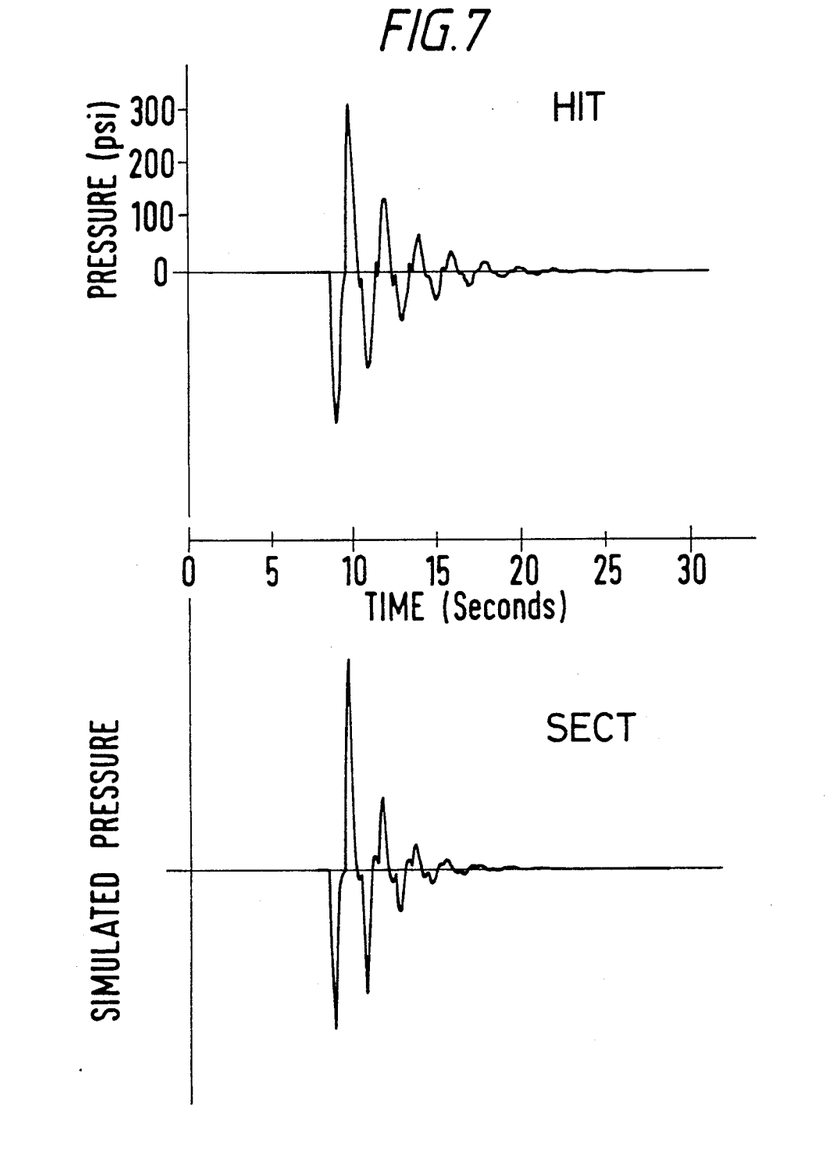
Figure 8:
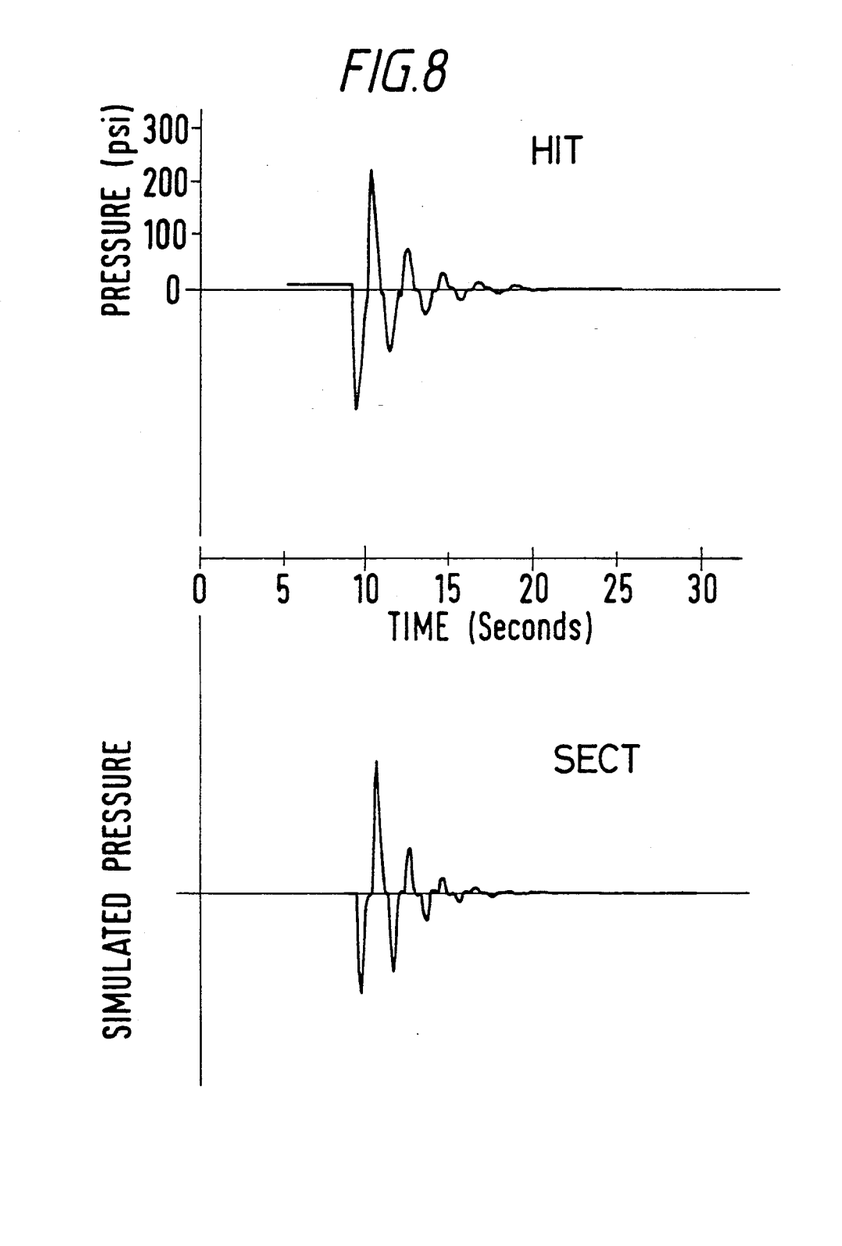

FIGS. 7 and 8 represent the fracture reclosing as the pressure was reduced.

| FRACTURE DIMENSIONS | | |
|---|---|---|
| HEIGHT (m) | HALF LENGTH (m) | FIGURE |
| 2.0 | 19.1 | 2 |
| 3.2 | 19.1 | 3 |
| 3.7 | 37.0 | 4 |
| 3.2 | 40.0 | 5 |
| 3.2 | 42.2 | 6 |
| 3.6 | 15.0 | 7 |
| 3.6 | 14.0 | 8 |

Figure 3:
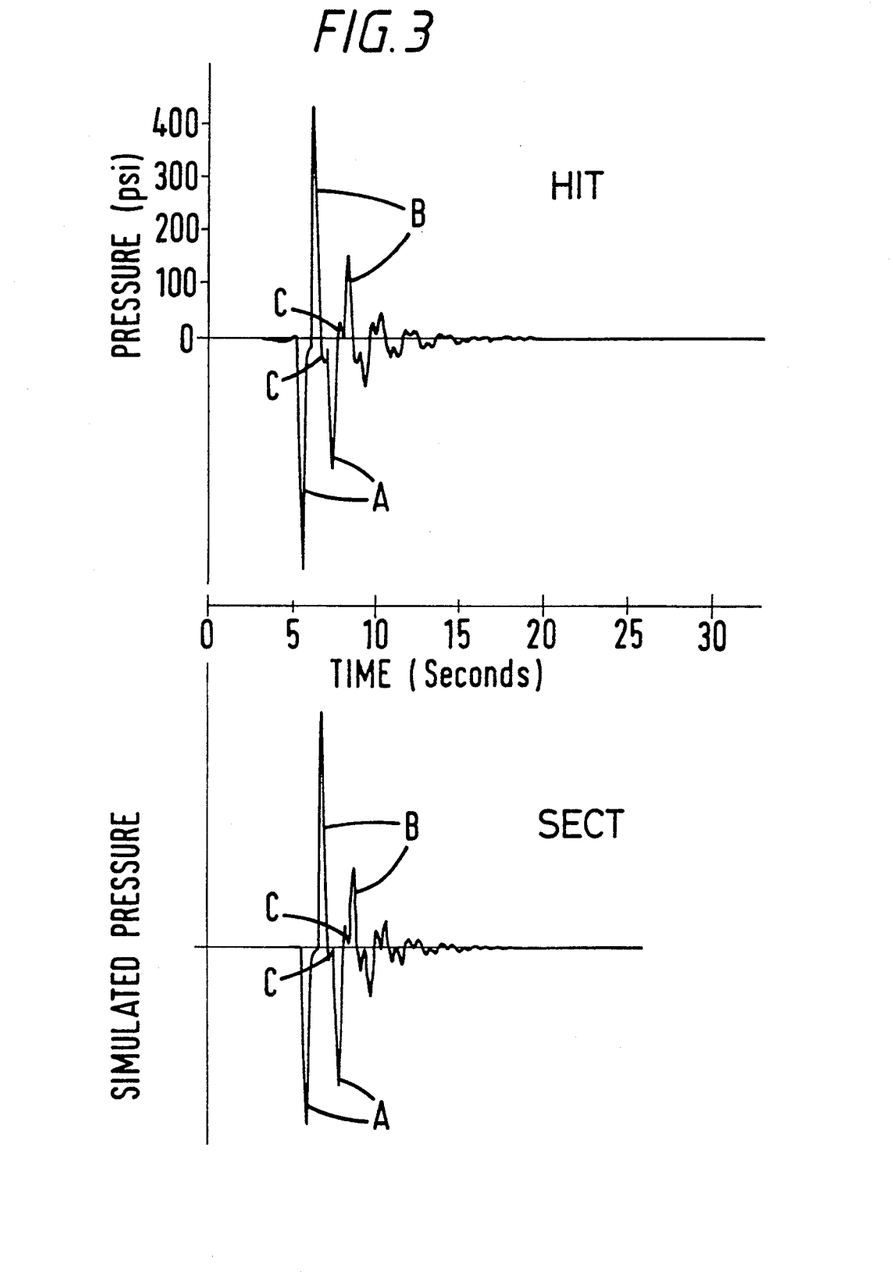
Figure 4:
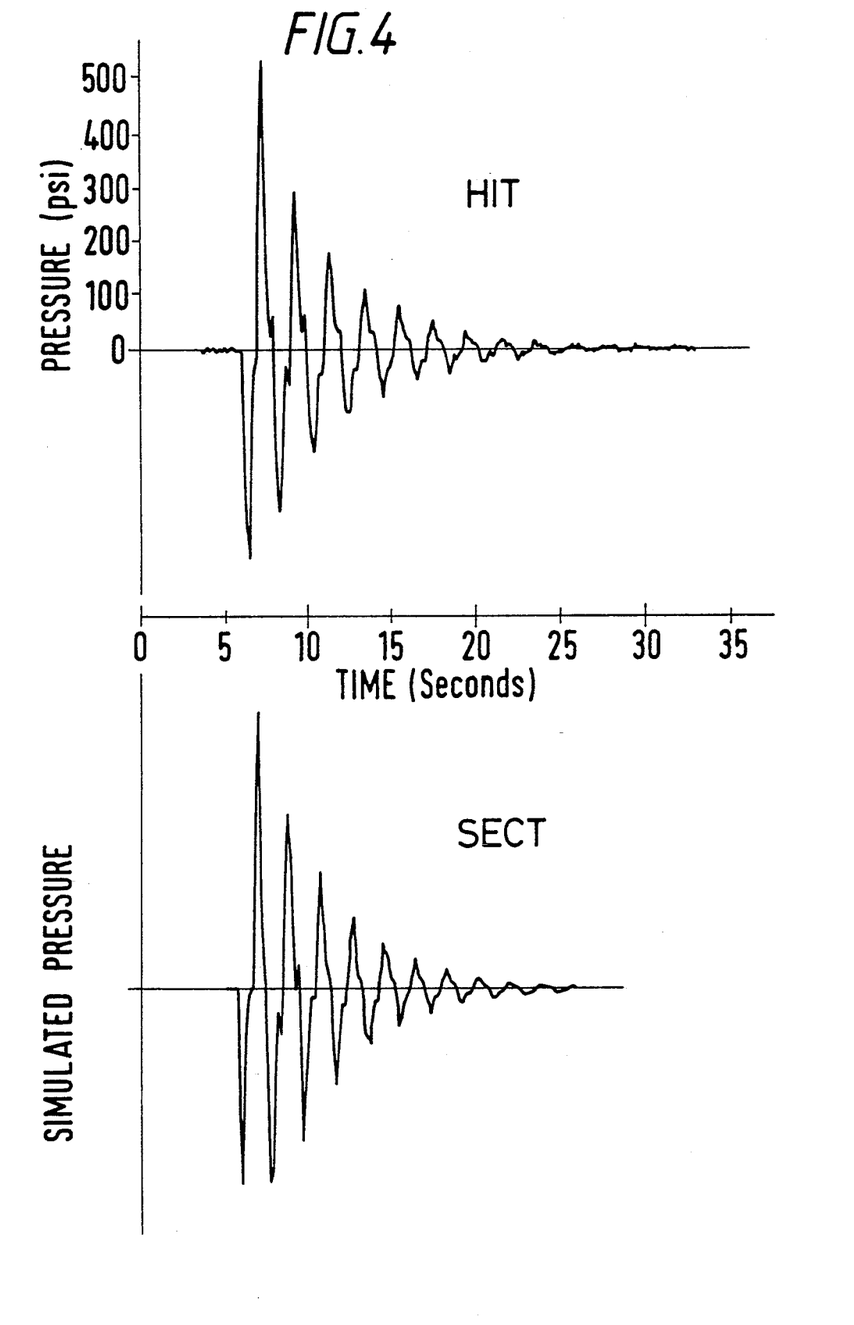
Figure 5:
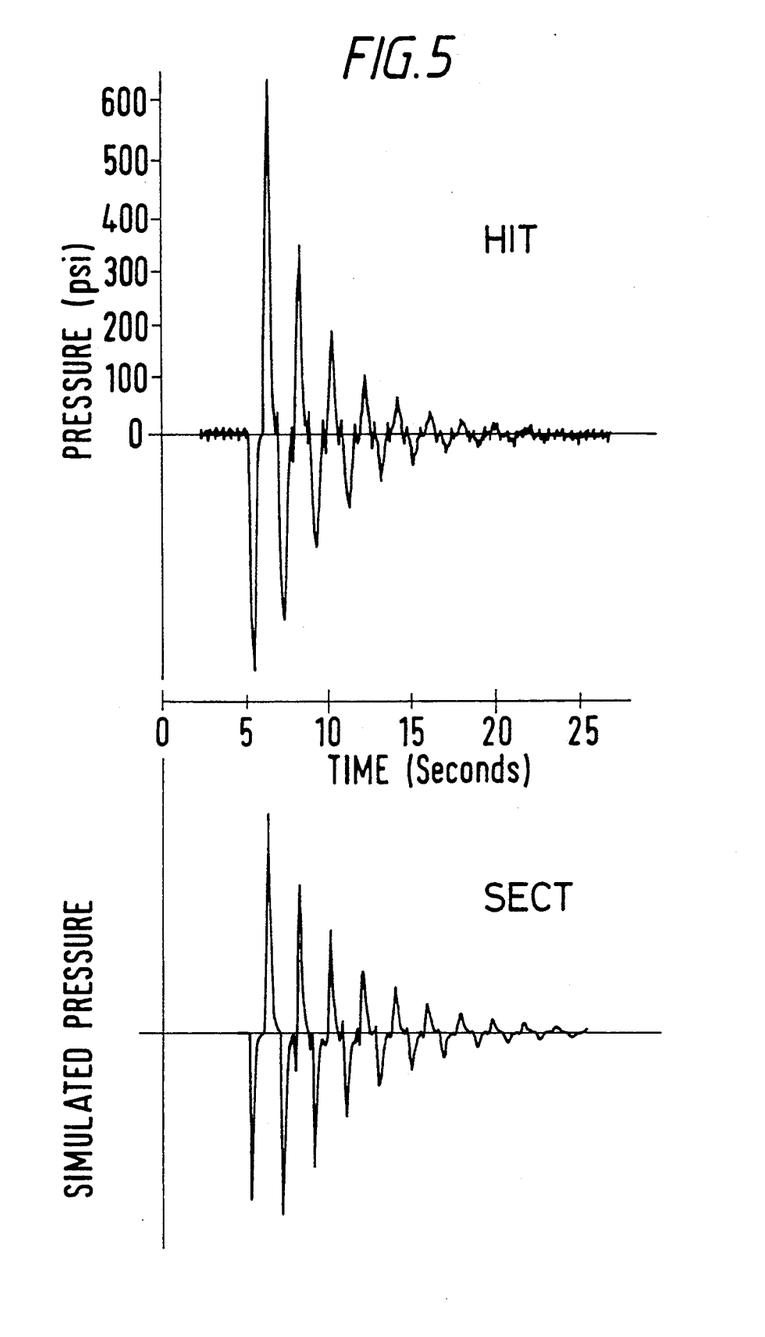
Figure 6:
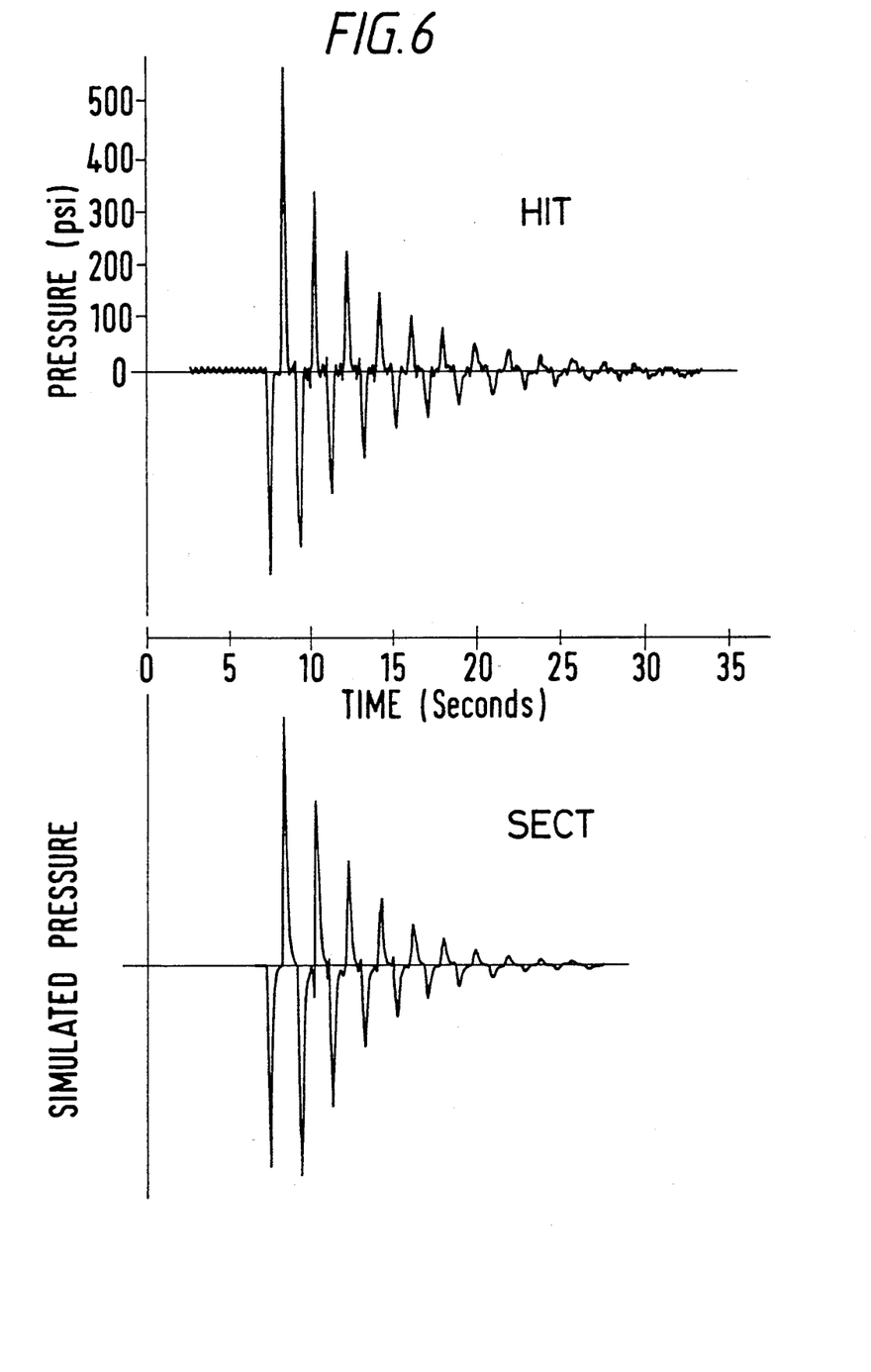

Using FIG. 3 as a typical example, the HIT trace contains successive reflections from the fracture mouth represented as (A) and (B), each one (B) out of phase with the previous one (A). This occurs because the fracture has a lower acoustic impedance than the well bore, producing an antiphase reflection. In addition there are echoes represented as (C) from the fracture tip occuring after each of the reflections from the fracture mouth.

Each echo has the opposite phase to the reflection from the fracture mouth preceding it beacuse the pressure wave suffers no phase reversal either during transmission into the fracture or during reflection at the fracture tip.

The SECT simulation in each case has produced a close fit to the HIT trace by using transmission lines to model the fracture as two-winged, elliptical and coplanar with the well bore. The height of the fracture determines its impedance and hence governs the decay envelope which can be clearly seen on the HIT trace. The fracture length is then found from the delay time of the echoes and calculated values of the sonic velocity in that height of fracture.

EXAMPLE 2

A similar procedure was performed on a well in the Magnus Field situated in the North Sea.

Figure 9:
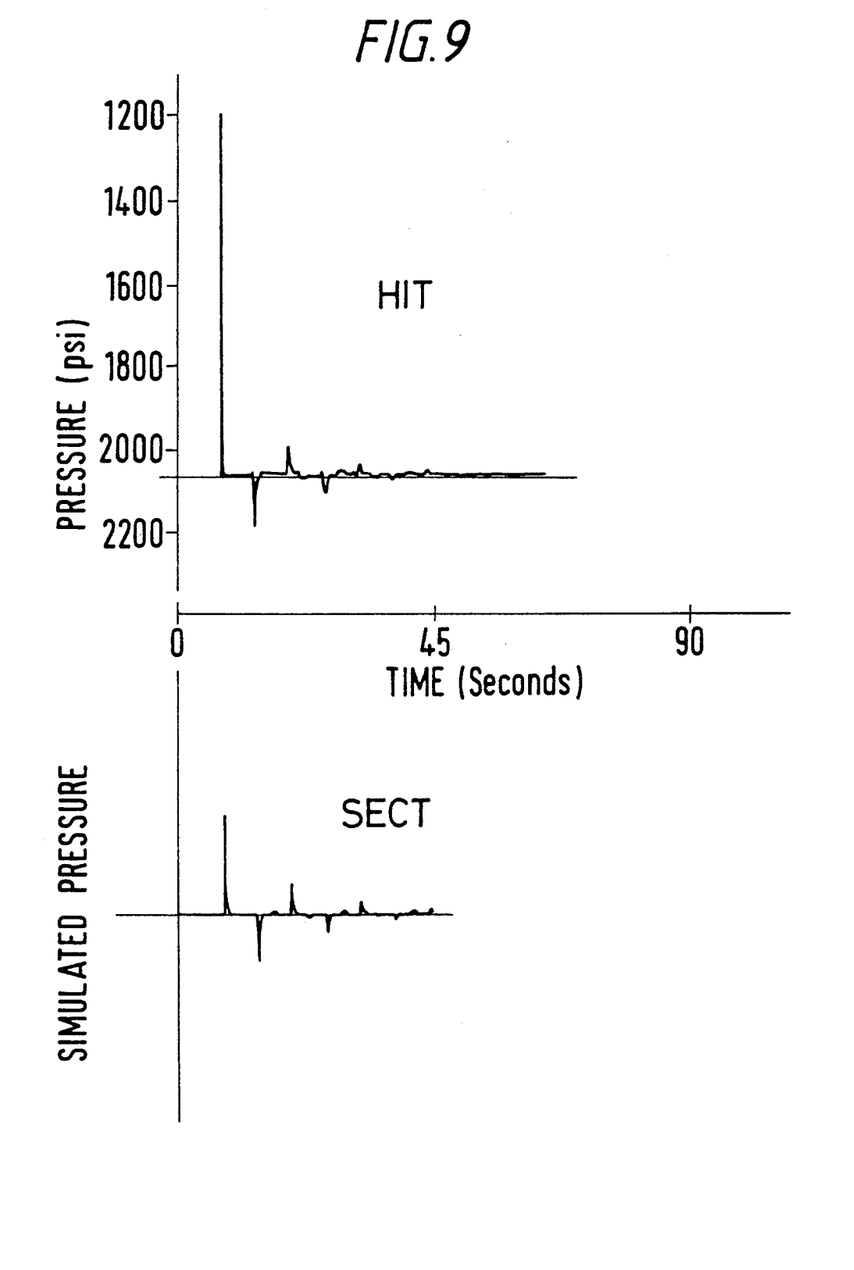
FIG. 9 shows the comparison between the HIT and SECT traces for the well of Example 2.

Magnus C2 comprised a 17.78 cm linear tubing section from the well head down to the performation layer at a depth of approximately 4500 meters. FIG. 9 shows the comparison between the HIT and SECT traces for this well from which the fracture height inferred using the SECT simulation was 6.0 meters with a half length of 141 meters.

From this Example it can be seen that HIT analysis can be used on reservoirs where the fractures extend some distance into the formation.

We claim:

1. A method for determining the height and length of a fracture in a formation in contact with a borehole comprising the steps of:
   (a) generating a hydraulic pressure pulse in the fluid in the borehole, said pressure pulse propagating to the bottom of the wellbore-fracture system and to the tip of the fracture,
   (b) obtaining an indication of the resultant reflections of said pressure pulse from both the mouth and the tip of the fracture, wherein the indication of the reflections of the pressure pulse from both the mouth and tip of the fracture are represented as pressure fluctuations against time,
   (c) identifying the reflections from both the mouth and tip of said fracture in said indication,
   (d) generating a theoretical model of the wellbore-fracture system, said model having impedance as a parameter,
   (e) adjusting the parameter of impedance in said model to obtain a match with said reflection from the mouth of the fracture in said indication to determine the height of the fracture, and
   (f) measuring the delay time between the reflection from the mouth and tip of the fracture in said indication to obtain the length of the fracture.

2. A method according to claim 1 wherein the hydraulic pressure pulse is produced by opening and closing a valve on the wellhead.

3. A method according to claim 1 wherein the indication of the reflections of the pressure pulse from both the mouth and the tip of the fracture are obtained by means of a transducer in contact with the fluid in the wellbore.

4. A method according to claim 1 wherein the theoretical model is obtained by representing the wellbore-fracture system as analogous to lengths of electrical transmission lines.

5. A method according to claim 1 further comprising the preliminary step prior to fracturing of generating a hydraulic pressure pulse in the fluid in the borehole, said pressure pulse propagating to the bottom of the wellbore, and obtaining an indication of the resultant reflection of said pressure pulse from the bottom of the wellbore.

6. The method of claim 1 wherein the theoretical model of step (d) is an electrical analog system.

* * * * *